United States Patent
Buvel et al.

(10) Patent No.: US 6,272,388 B1
(45) Date of Patent: Aug. 7, 2001

(54) PROGRAM STRUCTURE AND METHOD FOR INDUSTRIAL CONTROL

(75) Inventors: Raymond L. Buvel, Wauwatosa; Steven K. Chandler, Dousman; Joseph P. Izzo, New Berlin; Lawrence G. Searing, Nashotah; Norman S. Shelvik, West Allis, all of WI (US)

(73) Assignee: Rockwell Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/163,106

(22) Filed: Sep. 29, 1998

(51) Int. Cl.$^7$ .................................................. G05B 19/42
(52) U.S. Cl. ........................... 700/86; 700/23; 700/108; 712/241
(58) Field of Search ................. 700/111, 23, 86–88, 700/25, 108; 710/315, 32, 37; 712/231, 241, 244

(56) References Cited

U.S. PATENT DOCUMENTS

| | | | |
|---|---|---|---|
| 5,485,620 | * | 1/1996 | Sadre et al. ............................. 700/83 |
| 5,564,049 | * | 10/1996 | Schmidt ................................ 707/104 |
| 5,619,409 | * | 4/1997 | Schultz et al. ......................... 700/11 |
| 5,819,097 | * | 10/1998 | Brooks et al. ......................... 700/86 |
| 6,088,624 | * | 7/2000 | Khan et al. ............................ 700/86 |

* cited by examiner

Primary Examiner—William Grant
Assistant Examiner—Kidest Bahta
(74) Attorney, Agent, or Firm—Keith M. Baxter; Alexander M. Gerasimow; William R. Walbrun

(57) ABSTRACT

A table of sequential call statements is used to organize various program portions of the operating system of an industrial controller. This organizing structure allows troubleshooting of individual program portions of the operating system as are intimately related to the controlled process and the control hardware on an individual basis without the need to generate dummy programs or "stubs" to replace the unexecuted program portions. Those program portions not being executed have their call instructions replaced by NOP instructions. The call table may be edited to provide for different operating modes of the industrial controller without the need for mode test flags otherwise dispersed within the program code of the operating system.

7 Claims, 2 Drawing Sheets

PROGRAM STRUCTURE AND METHOD FOR INDUSTRIAL CONTROL

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to a program architecture for a real time industrial control system and particularly to a program structure well suited for the development of complex, real-time operating systems for industrial controllers.

Industrial controllers are special purpose computers used for controlling industrial processes or manufacturing equipment. Under the direction of a stored program, the industrial controller examines a series of inputs reflecting the status of the controlled process and changes outputs effecting the control of the process. The inputs are most simply binary, that is "on" or "off", however analog inputs and outputs taking on a continuous range of values are also used. The binary inputs and outputs may be represented by single bits of data; the analog inputs and outputs may be represented by multiple-bit data words.

It is desirable in industrial control that the outputs change in response to the inputs in a way so that the operation of the control program is predictable, race conditions are minimized, and the relative order of control tasks is preserved. For these reasons, industrial controllers normally employ a three step execution sequence. In the first step, inputs to the industrial controller from sensors or other devices on the controlled process are collected and stored in an input/output (I/O) table so as to create a snapshot of the inputs at a given instant in time. In the second step, a user-defined control program is executed using the inputs from the I/O table as frozen in time. The execution of the control program creates outputs which are written to the I/O table. In the final step, outputs from the I/O table are transmitted to the particular machines as control outputs to actuators and the like and the process is repeated.

Traditionally, larger industrial controllers have used dedicated circuitry for the input and output scanning steps allowing the primary processor to be dedicated to the execution of a control program. With the advent of increasingly powerful microcontrollers, however, it is possible to perform all the steps of input scanning, output scanning and execution of the control program on a single general purpose processor to create a compact, versatile control unit. Such a "processor-based" system must additionally handle numerous other tasks including the monitoring of communication channels and error conditions and responding to higher level mode control commands from the user, all the while preserving real-time control.

Following normal procedures for software development, the operating system may be divided into a number of smaller "modules" each of which may be developed independently by a separate team of individuals. Each module may be separately tested and then integrated with the others. The high degree of interaction between the modules of an industrial controller operating system and the complex interaction between the modules and hardware of the industrial controller make testing and integration of the modules particularly challenging. Each module may need to be tested alone and in various combinations with other modules. For this purpose, it is known to write "stubs", that is dummy modules that handle calls from the modules being tested to the modules not being tested, so as to accommodate their interactions. Creating the stubs is burdensome and in many cases complicated. Poorly written stubs may introduce additional errors into the program.

In an industrial controller, it is normal for the operating system to operate in a number of modes in which different functions are activated or deactivated. For example, the industrial controller may be operated in a "program mode" where inputs are read but the control program is not executed so as to test the input lines and circuitry. A "test mode" allows the inputs to be read and the control program run, but no outputs are created, allowing testing of the control program. Finally, a "run mode" allows all three of: reading inputs, executing the control program, and writing outputs to occur. These mode changes are typically invoked by "front panel" switches (which may in fact be from a remote terminal) representing user inputs that override all other tasks of the operating system. Mode changes in the operating system may be implemented through mode flags read by "test" instructions placed in the various modules of the operating system. Embedding these "test" instructions throughout the operating system code is cumbersome and makes development and testing of the operating system difficult. A similar problem occurs when different versions of the controller are produced which have different functional requirements and thus which require different combinations of the modules.

What is needed is a program structure that allows for simplified development of modules of a real-time operating system for an industrial controller, the integration and testing of the modules, the selective activation of modules according to mode changes in the operating system or different configurations of the controller.

BRIEF SUMMARY OF THE INVENTION

The present invention provides an architecture for the development of complex real-time operating systems for industrial controllers that uses a central "call table" consisting of a list of call instructions to modules of the operating system. The calls of the call table are executed in sequence until a terminating, jump instruction is executed which returns the program execution to the first call, whereupon the process is repeated. The call table provides a single, centralized way of enabling or disabling modules of the operating system (by selectively overwriting calls with a "no operation" (NOP) instruction) and provides an intuitive and powerful framework for program development.

As modules are developed, calls to the modules may be added to the call table. In this way, the operating system may be tested with any combination of modules at any time during module development.

Other call tables may be called by the first call tables to provide similar benefits within the modules themselves thus allowing this technique to be used for programs of arbitrary complexity. Returns from the loops of nested call tables are accomplished by an overriding of the terminating jump instruction or similar technique.

Specifically then, the invention provides for an industrial control system employing a general-purpose electronic computer operating to execute standard computer instructions. An operating system executed by the electronic computer includes a sequentially executed program portion being a call table containing a plurality of call instructions to addresses of other program portions and a terminating instruction at the end of the plurality of call instructions causing an indefinite repeated execution of the call table. A plurality of periodically executed program portions are at the addresses of the call table and have instructions providing industrial control functions followed by a terminating instruction causing a return from a call.

Thus it is one object of the invention to provide a program structure allowing repeated execution of program modules for predictable real-time control.

It is yet another object of the invention to provide a framework that allows simplified testing of individual modules and their interaction with hardware on a real-time basis. Deletion or insertion of call instructions in a centralized call table allows modules to be easily added or removed without the generation of complex and error-inducing stub programs. This is particularly valuable for creating different controllers having different functional capabilities.

At least one of the periodically executed program portions may include a second call table containing a second plurality of call instructions to addresses of other program portions and a second terminating instruction at the end of the second plurality of call instructions causing, in a first state, a repeated execution of the call table. At least one other program portion may switch the second terminating instruction from the first state upon a predetermined condition to a second state, the second state causing a return.

Thus, it is another object of the invention to allow the call table structure to be used at various levels throughout the program so as to break up individual modules into individually testable and convenient sub-modules. The cycling of the second call tables may be broken by a changing of the termination instruction by one of the call program portions.

The industrial control system may include a call table editor responding to user commands to remove call instructions from the call table and replace them with NOP instructions or to replace NOP instructions with call instructions.

Thus it is another object of the invention to allow a reliable method of mode changing in an industrial controller operating system in which certain portions of the operating system are enabled or disabled according to user commands. By use of a call table structure and by removing or adding call instructions to the call table, the need for multiple flags spread throughout the program modules responding to state changes may be eliminated, significantly simplifying the development of the modules.

The call table may include an address table separately holding addresses of the call table and the call table editor may respond to the user commands to restore call instructions to the call table by replacing the NOP instructions with call instructions to addresses as read from the address table.

Thus it another object of the invention to allow modification of the call table to be reversible by separately storing the addresses of the call table.

The foregoing and other objects and advantages of the invention will appear from the following description. In this description references are made to accompanying drawings which form a part hereof and in which there is shown by way of illustration a preferred embodiment of the invention. Such embodiment does not necessarily represent the full scope of the invention, however, and reference must be made therefore to the claims for interpreting the scope of the invention.

DETAILED DESCRIPTION OF THE INVENTION

Figure 1:
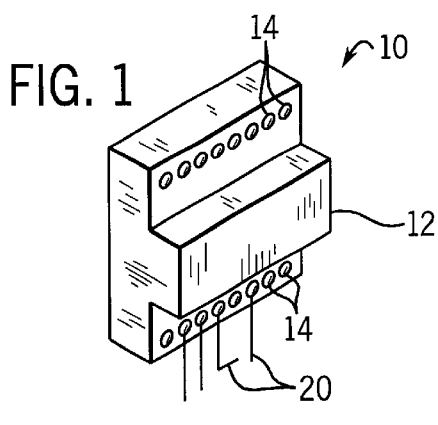
FIG. 1 is a perspective view of a compact industrial controller such as may use the present invention and having multiple terminal strips for communication of input and output data with a controlled process.

Referring now to FIG. 1, an industrial controller 10 provides a housing 12 containing internal control circuitry (not shown in FIG. 1) for executing a control program and external terminal strips 14 that may be connected to lines 20 conveying output signals from the controller 10 to a controlled process (not shown) and receiving input signals from the controlled process.

Figure 2:
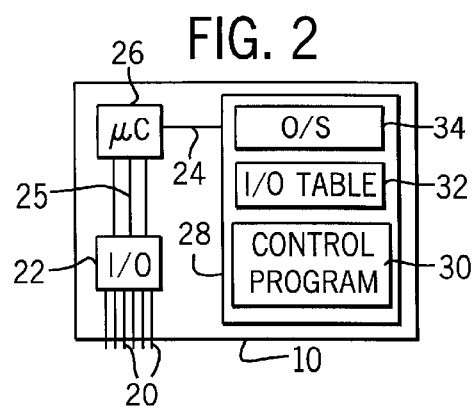
FIG. 2 is a block diagram of the principle components of the controller of FIG. 1 showing a single microprocessor communicating with interface circuitry with a memory holding an operating system, and with an I/O table and a control program.

Referring now to FIG. 2, the input and output signals on lines 20 are received through an I/O circuit 22 which connects via I/O lines 25 to a microcontroller 26 such as may be a single chip microcontroller of a type well known in the art. An internal bus 24 communicates between the microcontroller 26 and a memory 28 which holds a control program 30 written for controlling the particular controlled process using ladder logic language or other languages well understood in the art.

The control program 30 is executed cyclically by the microcontroller 26 to read input signals from the controlled process and create output signals to the controlled process as may be communicated via the I/O circuit 22. For this purpose, memory 28 also includes an I/O image table 32 storing values of inputs and outputs communicated over lines 20 for use by the control program 30. Thus the control program 30 need not directly access signals from the controlled process and more importantly has access to a set of inputs frozen at a single interval in time regardless of the duration of execution of the control program through one cycle.

The memory 28 also includes an operating system 34 which controls the collection of input signals to the I/O table 32, activates the control program 30 when that collection is complete to run for one cycle, and subsequent to the execution of the control program for one cycle, deactivates the control program, and writes of the outputs generated from the I/O table 32 through I/O circuit 22 back to lines 20.

Figure 3:
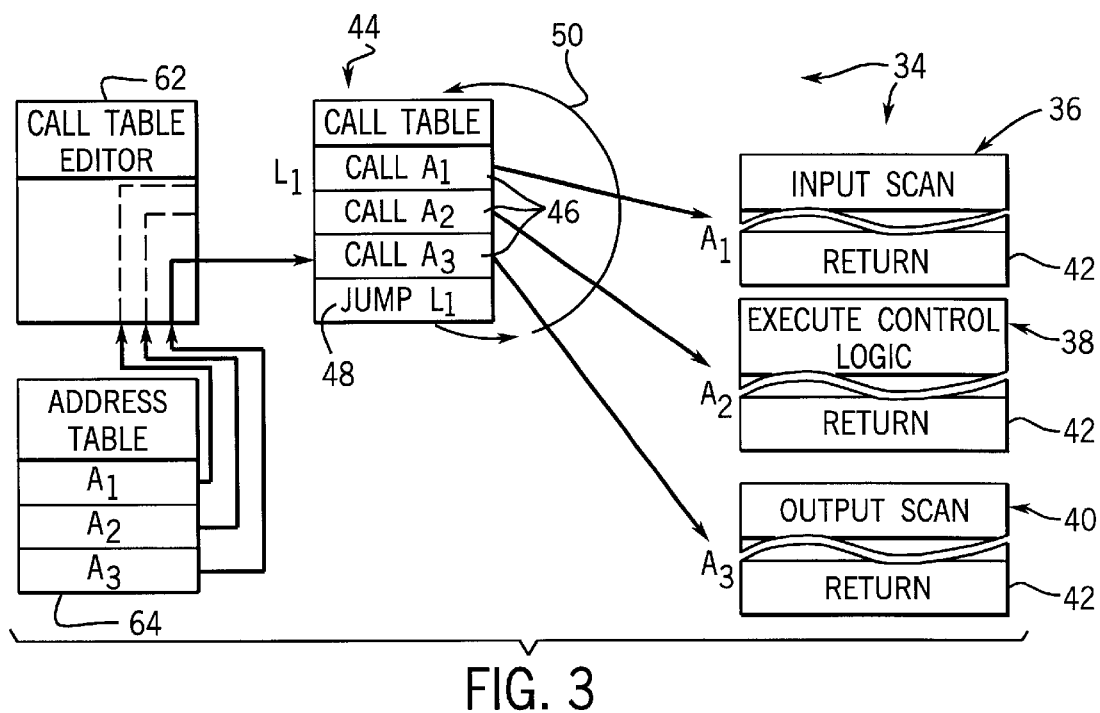
FIG. 3 is a schematic representation of the operating system of FIG. 2 having a call table, a call table editor and an address table wherein the call table organizes a sequence of call instructions to other modules of the operating system such as are repeatedly executed.

Referring now to FIG. 3, each of these three steps executed by the operating system may be a separate program portion 36, 38 or 40. The scanning of input values into the I/O table being portion 36, the execution of the control logic of the control program using the values of inputs from the I/O table 32 being portion 38 and the output scanning transferring output values from I/O table 32 to the controlled process being portion 40. It will be understood that the operating system will include many other portions including initialization and communication protocol portions, error handling portions and the like, per standard operating system design, however, three portions only are shown for clarity.

In the example of FIG. 3, the input scan routine portion 36 has a first instruction at address $A_1$, whereas the execute control logic portion 38 has a first address at address $A_2$, and the output scan program portion 40 has a first address at address $A_3$.

Each of these portions 36, 38 or 40 is concluded by a return instruction 42 to affect a return from a corresponding call instruction to be described. As is generally understood in the art, a call instruction moves the execution point of a program from the point of a call instruction to another point in the program by loading the program counter of the processor with the address of the starting instruction of the program portion to which control will be transferred. A call instruction differs from a jump instruction in that certain registers holding values used by the calling portion (including a return address) are placed on a stack so that upon a return instruction, the value of these registers may be popped off of the stack so that the calling program may resume execution as if uninterrupted.

Generally, during development of the operating system 34 and during execution of the operating system, it may be desired to execute some but not all of the program portions 36, 38 and 40. Further, during execution of the operating system 34, it is desired that the program portions 36, 38 and 40 be repeatedly executed in a predetermined order. In the present invention, both of these goals are accomplished by a call table 44 having a sequence of call instructions 46 contiguously arranged and terminated by a terminating jump instruction 48 having a target address, in this case $L_1$, which is the first call instruction. As depicted, the call instructions 46 of the call table 44 call, respectively, addresses $A_1$, $A_2$ and $A_3$ and address $L_1$ may be the starting address of the operating system 34. Thus when the operating system begins execution, the call instructions 46 are immediately executed in sequence until terminating instruction 48 occurs, and then call instructions 46 are again repeated in an endless cycle indicated by arrow 50.

At each call instruction 46, program execution is transferred to the particular program portions 36, 38 and 40 corresponding to the call instruction, upon which the portions execute their instructions until a return instruction 42 is encountered, whereupon control returns to the call table 44 and the next call instruction 42 is executed. During development of the program portions 36, 38 and 40, individual program portions or combinations of program portions may be tested by placing only selected call instructions 46 for those program portions in the call table 44 and filling rows in the call table 44 corresponding to modules that are not yet complete or that are not part of the test with a NOP instruction. As well as allowing individual program portions to be tested in any combination without the need to develop stub programs, this technique allows testing to be performed as the program portions are completed and simple integration of program portions as they are completed.

As is understood in the art, a NOP instruction simply passes control to the next instruction without effect. A NOP instruction may be a particular instruction designated as such by the manufacturer of the microcontroller 26 or may be any instruction performing no important function in the context of the program.

Figure 5:
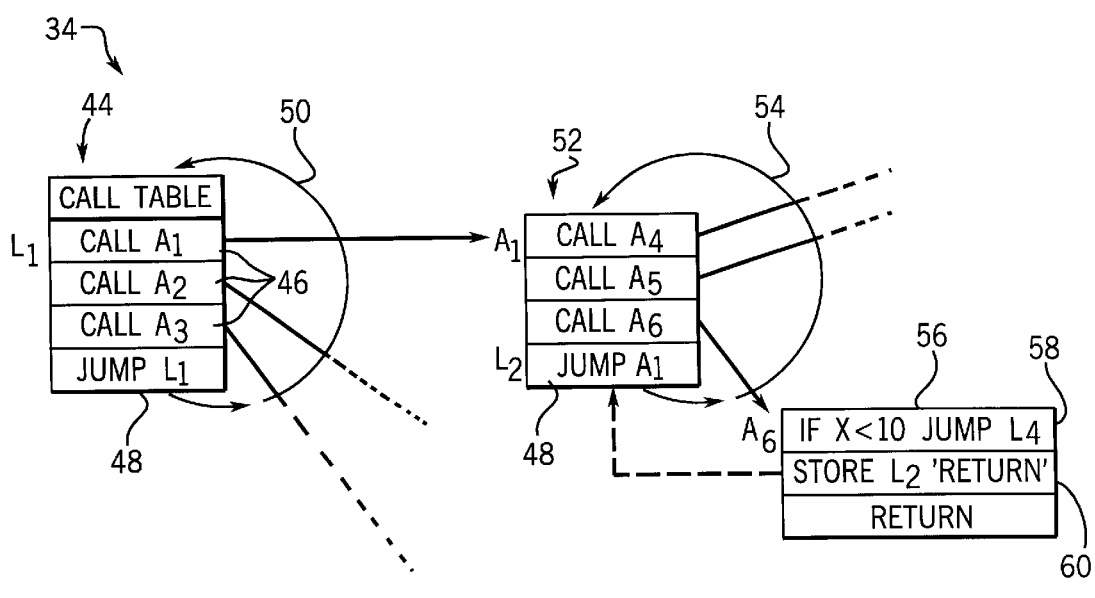
FIG. 5 is a representation similar to FIG. 3 showing nested call tables as may be used to further parse the modules of the operating system into manageable units and showing an individual, periodically executed program called by a second call table to modify that second call table and thus to effect a return to the primary call table.

Referring now to FIG. 5, a particular call instruction, for example the first call instruction calling address $A_1$, may transfer control not to program portions 36, 38 and 40, but instead to a secondary call table 52, in this case including call instructions to addresses $A_4$–$A_6$, each being the first addresses of other modules not shown. These other modules may terminate with a return instruction 42 and the secondary call table 52 may also terminate with a terminating jump instruction 48 at address $L_2$, this time targeting address $A_1$, the first address of the secondary call table 52. Thus, the instructions of the secondary call table 52 execute in a cycle 54 and allow a particular call, in this case to address $A_1$, to be further resolved into multiple other call instructions to smaller program portions. This finer division of the operating system may be desirable when a given program portion has become overly large and thus difficult to write and troubleshoot or where particular portions of the program portion may need to be executed individually, either for testing or by preference as part of a different operating mode of the operating system as will be described below.

The cyclic execution 54 of the secondary call table 52 must be terminated eventually for control to be returned to the primary call table 44, and this is accomplished by program portion 56, having a beginning address $A_6$, as is called by the secondary call table 52. The program portion 56, based on some predetermined condition tested by instruction 58 causes a storing in address $L_2$, the address of the terminating jump instruction 48 of the secondary call table, a return instruction to overwrite the jump instruction normally there. For example as shown, a variable x (previously incremented in program portion 56 not shown) is tested, and if the test is false, the overwriting of the jump instruction of call table 52 is performed by instruction 60. In either case, a return instruction is then executed as is the case for the typical program portion 56. Thus, the cycle 54 of the secondary call table 52 is not indefinite but may be terminated after a several cycles. Such a secondary call table 52 may be used for initialization features in the operating system where once the initialization is complete, it is no longer called.

Figure 4:
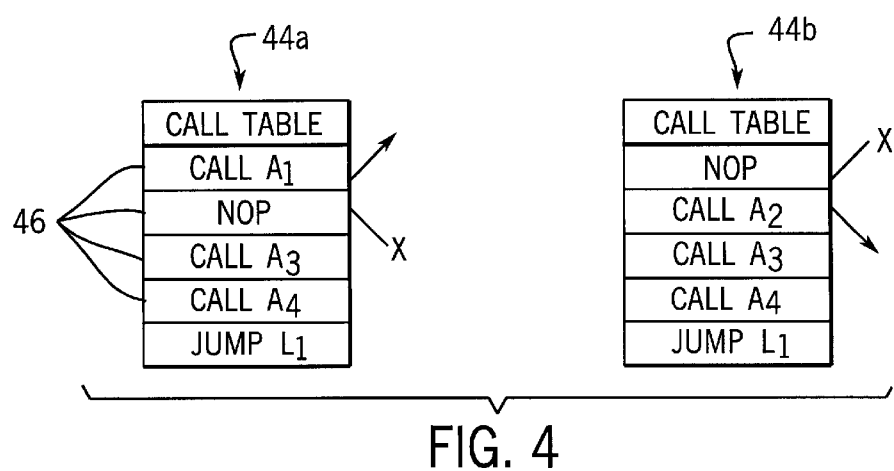
FIG. 4 is a diagram representing two states of the call table for different modes in which individual call instructions are replaced or restored to affect a mode change in the operate system.

Referring now to FIGS. 3 and 4, a principal benefit of the present invention is that it allows simplified mode changes of the operating system 34 by editing of the call table 44. In particular, a call table editor 62 which may be a program operating, for example, on interrupt basis as invoked by user commands to the controller 10, may edit the call table 44 specifically by adding or removing call instructions 46. Thus, for example, in a first mode and as shown in FIG. 4, a first call to address $A_1$ may be followed by a NOP instruction then followed by a call to address $A_3$. Upon user command to call table editor 62, the call to address $A_1$ may be replaced by a NOP instruction as shown in table 44b, and the NOP instruction of table 44a may be replaced with a call to instruction $A_2$.

The instruction $A_2$ in this example, and whenever a call instruction is to be restored to the call table 44 by the call table editor 62, is obtained from an address table 64 holding the addresses for particular rows of the call table 44 on a one-to-one correspondence with rows of the call table 44. A principal use of the mode changing is to switch between the three modes of operation: i.e., (1) "programming mode", in which case the call to $A_1$, would be in place in the call table 44, but the call to $A_2$ and $A_3$ would be NOP instructions to cause an input scan but no execution of either the control logic per portion 38 or the output scan per portion 40; (2) the "test mode" in which the call to $A_1$ and the call to $A_2$ are restored but the call to $A_3$, the third line of table 44, is replaced with a NOP instruction, and (3) the run mode in which the calls to $A_1$, $A_2$ and $A_3$ may all be restored per the address table 64.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. An industrial control system comprising:
   a general purpose electronic computer operating to execute standard computer instructions;
   a program executed by the electronic computer including:
   (a) a sequentially executed program portion having:
      (i) a call table containing a plurality of call instructions to addresses of other program portions;
      (ii) a terminating instruction at the end of the plurality of call instructions causing an indefinite repeated execution of the call table;
   (b) a plurality of periodically executed program portions at the addresses having:
      (i) instructions providing industrial control functions;
      (ii) a terminating instruction at the end of the periodically executed portions causing a return from a call;
   whereby the periodically executed portions of the program are repeatedly executed in the order of the call table for predictable real time control.

2. The industrial control system of claim 1 wherein at least one of the periodically executed program portions includes:
   (i) a second call table containing a second plurality of call instructions to addresses of other program portions;
   (ii) a second terminating instruction at the end of the second plurality of call instructions causing, in a first state, a repeated execution of the call table;
   at least one other portion switching the second terminating instruction from the first state upon a predetermined condition to a second state, the second state causing a return.

3. The industrial control system of claim 1 including further a call table editor responding to user commands to remove call instructions from the call table and replace them with NOP instructions.

4. The industrial control system of claim 3 wherein the call table includes an address table separately holding the addresses of the call table and wherein the call table editor also responds to the user commands to restore call instructions to the call table by replacing the no operation instructions with call instructions to addresses as read from the address table.

5. The industrial control system of claim 4 wherein the user command is a mode command and wherein the table editor responds to the mode command to remove predetermined call instructions from the call table and to restore predetermined other call instructions to the call table.

6. The industrial control system of claim 1 wherein the first instruction of the program is a call of the call table.

7. A method of developing a sequentially executing real-time program for industrial control for use on a general purpose electronic computer operating to execute a standard computer, the method comprising the steps of:
   creating a call table to hold a plurality of call instructions to addresses of other program portions followed by a terminating instruction causing a repeated re-execution of the call table;
   writing a plurality of other program portions at the addresses for periodic execution;
   upon completion of each of the plurality of other program portions, entering its address into the call table;
   whereby the program is tested prior to completion of all of the other program portions.

* * * * *